(12) United States Patent
Aoyama et al.

(10) Patent No.: US 7,014,031 B2
(45) Date of Patent: Mar. 21, 2006

(54) METHOD AND APPARATUS FOR CONVEYING PARTS

(75) Inventors: Yoshitaka Aoyama, 20-11, Makitsukadai 2-Cho, Sakai-Shi, Osaka 590-0114 (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 13 days.

(21) Appl. No.: 10/402,082

(22) Filed: Mar. 27, 2003

(65) Prior Publication Data

US 2003/0221936 A1   Dec. 4, 2003

Related U.S. Application Data

(62) Division of application No. 09/786,652, filed as application No. PCT/JP00/06081 on Sep. 7, 2000, now Pat. No. 6,607,067.

(30) Foreign Application Priority Data

Oct. 11, 1999   (JP)   ................. 11-325916

(51) Int. Cl.
    *B65G 27/00*   (2006.01)
(52) U.S. Cl. ................... 198/391; 198/396; 198/383; 198/757
(58) Field of Classification Search ............... 198/396, 198/395, 383, 391, 444, 460.1, 757
    See application file for complete search history.

(56) References Cited

U.S. PATENT DOCUMENTS

| | | | |
|---|---|---|---|
| 2,545,756 A | * | 3/1951 | Andren .................... 29/749 |
| 3,056,446 A | * | 10/1962 | Schmidt et al. ............ 29/714 |
| 3,165,139 A | * | 1/1965 | Whitney, Jr. ................ 29/715 |
| 3,295,661 A | * | 1/1967 | Mitchell, Jr. et al. ....... 198/391 |
| 3,414,112 A | * | 12/1968 | Ravn ........................ 198/391 |
| 3,460,230 A | * | 8/1969 | Moulin ...................... 29/715 |
| 3,508,639 A | * | 4/1970 | Denver ..................... 198/391 |
| 3,523,316 A | * | 8/1970 | Alexander ................. 470/50 |
| 3,733,883 A | * | 5/1973 | Kaczmarek ................ 72/402 |
| 3,963,456 A | * | 6/1976 | Tsuchiya et al. ........... 29/739 |
| 4,182,030 A | * | 1/1980 | Mullins ..................... 29/753 |
| 4,206,593 A | * | 6/1980 | Su et al. .................... 60/774 |
| 4,236,302 A | * | 12/1980 | Kuehling ................... 29/753 |
| 4,348,806 A | * | 9/1982 | Eves et al. ................. 29/863 |
| 4,629,054 A | * | 12/1986 | Kondo ...................... 198/388 |
| 4,640,407 A | * | 2/1987 | Widener et al. ........... 198/389 |
| 4,640,408 A | * | 2/1987 | Eaves ...................... 198/460.1 |
| 4,778,043 A | * | 10/1988 | Sticht ....................... 198/389 |
| 4,828,100 A | * | 5/1989 | Hoppmann et al. ........ 198/392 |
| 4,921,092 A | * | 5/1990 | Crawford et al. ......... 198/460.1 |
| 5,050,722 A | * | 9/1991 | Beswick .................... 198/392 |
| 5,070,995 A | * | 12/1991 | Schaffer et al. .......... 198/460.1 |
| 5,082,103 A | * | 1/1992 | Ross et al. ............... 198/460.1 |
| 5,191,960 A | * | 3/1993 | Wareham ................... 198/391 |
| 5,311,977 A | * | 5/1994 | Dean et al. ................ 198/395 |
| 5,322,155 A | * | 6/1994 | Ito .......................... 198/460.41 |

(Continued)

*Primary Examiner*—Gene O. Crawford
*Assistant Examiner*—Rashmi Sharma

(57) ABSTRACT

An apparatus for conveying parts for use with parts with projections the protruding part of which is formed on either the upper side or the lower side as seen in the direction of height, has a regulating member (17) comprising a regulating portion of a width for preventing passage of the protruding part (11) of the part (10) and a non regulating portion (19) of a width allowing passage of the protruding part (11), to prevent passage of a part placed upside down in the case where such part is transferred.

5 Claims, 6 Drawing Sheets

U.S. PATENT DOCUMENTS

| | | | |
|---|---|---|---|
| 5,333,716 A | * | 8/1994 | Hoppmann et al. ......... 198/380 |
| 5,339,942 A | * | 8/1994 | Gasser et al. ............ 198/347.1 |
| 5,713,454 A | * | 2/1998 | Jordan ........................ 198/391 |
| 5,924,546 A | * | 7/1999 | Funaya ........................ 198/395 |
| 5,954,185 A | * | 9/1999 | Eshelman et al. .......... 198/396 |
| 6,257,392 B1 | * | 7/2001 | Graham ........................ 198/396 |

* cited by examiner

METHOD AND APPARATUS FOR CONVEYING PARTS

CROSS-REFERENCE TO RELATED APPLICATION

This application is a divisional application of, and claims the priority benefit of, U.S. application Ser. No. 09/786,652 filed on Jul. 9, 2001 now U.S. Pat. No. 6,607,067 which is a 371 of PCT/JP00/06081, filed Sep.7, 2000.

TECHNICAL FIELD

The present invention concerns a technology for conveying parts by aligning them in prescribed orientation by preventing passage of parts placed upside down. More specifically, this technology can be utilized for aligned conveyance of parts with projection the protruding part of which is formed on either the upper side or the lower side as seen in the direction of height as with a projection nut.

BACKGROUND ART

In the case where projection nuts having projections for welding, for example, are fed from a parts feeder, the projection nuts are arranged in a certain orientation of surface or back face before going out of the parts feeder. However, there are cases where the parts are fed out upside down for some reason or another and, to prevent them from being fed in a wrong state, a control method is known which consists in detecting the height of the parts and letting pass normal parts only while stopping unusual ones.

In the case where the two sides are discriminated based on the height of the parts conveyed, control may be easy if there is an appreciable difference in height between the parts looking upward and those looking downward but, if the difference in height is inappreciable, it is necessary to delicately adjust the space in height of the member which regulates the parts. For example, a projection nut generally has projections for welding formed at 4 corners of a square nut, and the quantity of protrusion in the direction of height of each projection is comparatively small while, in the direction of breadth, a quantity of protrusion larger than that in the direction of height is set. Therefore, in the case where the two sides are discriminated based on the height of parts, fine adjustment of the regulating member is rather difficult and even a slight deviation of adjusted value may make the discrimination impossible, thus letting pass parts which are placed upside down. Moreover, in the case of parts having hardly any difference in height between the upward looking state and the downward looking state, it is simply impossible to perform any control of passage based on the parts height.

DISCLOSURE OF INVENTION

According to an embodiment of the present invention, the method for conveying parts comprises the steps of connecting a parts feeder to a parts supply unit, providing a parts transfer passage for transferring parts with projections the protruding part of which is formed on either the upper side or the lower side as seen in the direction of height, disposing, at a position close to the parts feeder of the transfer passage, a regulating member for preventing passage of a part placed upside down in the case where such part is transferred, disposing a parts sensor at a position close to the supply unit of the transfer passage, detecting, with the parts sensor, reduction in the number of parts on standby between the parts sensor and the supply unit in the case where the passage of parts is prevented by the regulating member, operating the parts feeder with this detection signal, and issuing an abnormality signal in case no part is detected by the sensor after passage of a certain time from that operation.

By issuing a signal, with such operation, in case no supply of parts on standby is started even with passage of a certain time after the passage of parts placed upside down is prevented by the regulating member, it becomes possible to either give an alarm such as buzzer or lamp, etc. by using this signal or stop the operation of the parts feeder, and this is effective for reduction of noise and saving of electric power. In case no supply of parts on standby is made with passage of a certain time while the parts feeder continues working, it is possible to either stop the operation of the parts feeder or give an alarm to notify an abnormality by judging that the parts are prevented by the regulating member, and thus take remedial measures such as removal of unusual parts, etc.

According to another embodiment of the present invention, the method for conveying parts comprises the steps of connecting a parts feeder to a parts supply unit, providing a parts transfer passage for transferring parts with projections the protruding part of which is formed on either the upper side or the lower side as seen in the direction of height, disposing, at a position close to the parts feeder of the transfer passage, a regulating member for preventing passage of a part placed upside down in the case where such part is transferred, disposing a parts sensor at a position close to the parts feeder of the transfer passage and on the downstream side of the regulating member, and issuing, in the case where the passage of parts is prevented by the regulating member, an abnormality signal in case no part is detected by the sensor after passage of a certain time after the part immediately before the prevented part was detected by the parts sensor. Here also, an abnormality signal is issued in case a part is prevented by the regulating member, and it becomes possible to either give an alarm such as buzzer or lamp, etc. or stop the operation of the parts feeder by using this signal, and this is effective for reduction of noise and saving of electric power.

According to other embodiment of the present invention, the apparatus for conveying parts is designed for transferring parts with projections the protruding part of which is formed on either the upper side or the lower side as seen in the direction of height by aligning them in prescribed orientation, and comprises a regulating member for preventing passage of a part transferred in the state upside down. The regulating member performs regulation and control in response to the protruding part formed on either the upper side or the lower side of the part, and allows passage of parts in normal orientation only. Therefore, passage of parts placed upside down can be prevented without fail.

The regulating member may have a regulating portion of a width for preventing passage of the protruding part of the part, and a non regulating portion of a width allowing passage of the protruding part disposed at the top and at the bottom. This makes it possible to prevent passage of a part placed upside down the protruding part of which is caught by the regulating portion. On the contrary, in the case where the protruding part corresponds to the non regulating portion, the part is allowed to pass through. By thus installing the regulating portion and the non regulating portion in a fixed way, it becomes unnecessary to make any fine adjustment as in the prior art, and this helps to greatly improve the working accuracy and simplify the daily control at the same time. Furthermore, even in the case where there is hardly any difference in height of the parts whether they are placed in the upward looking direction or downward looking direction, passage of any parts in unusual direction can be prevented because of the relation between the regulating portion and the non regulating portion, enabling application to a wide range of parts with high utility.

The apparatus may comprise a sorting device disposed on the upstream side of the regulating member, and the sorting device not only guides the parts in linkage with the projections of the parts but also sorts out the parts by discriminating the surface and the back face of the parts and dropping parts placed upside down. The sorting device may be constructed with a portion in which the outside of the spiral passage is low, and a groove of a fixed length formed in the direction of transfer of parts in the spiral passage. The apparatus may comprise a collecting box for receiving parts dropped by the sorting device, the collecting box communicating with the inside of the bowl of the parts feeder.

The apparatus may comprise an unusual nut discharging device disposed on the upstream side of the sorting device, the discharging device being composed of the portion in which the outside of the spiral passage is low, an upright wall provided on the outer circumference of the portion, an opening formed in the upright wall, and an accumulating box, positioned below the opening, for receiving unusual parts dropping from the opening. In the case where the height of unusual parts is smaller compared with the normal parts, it is desirable to set the height of the opening higher than the unusual parts but lower than the normal parts.

According to still other embodiment of the present invention, the apparatus comprises a parts feeder, a sorting device for discriminating the surface and the back side of parts transferred through the spiral passage of the parts feeder and discharging parts placed upside down, and a discharging device disposed on the upstream side of the sorting device.

The sorting device may be constructed with a portion in which the outside of the spiral passage is low, and a groove of a fixed length formed in the direction of transfer of parts in the spiral passage. The apparatus may further comprise a collecting box for receiving parts discharged by the sorting device, the collecting box communicating with the inside of the bowl of the parts feeder.

The discharging device may be composed of a portion in which the outside of the spiral passage is low, an upright wall provided on the outer circumference of the portion, an opening formed in the upright wall, and an accumulating box, positioned below the opening, for receiving unusual parts dropping from the opening. In the case where the height of unusual parts is smaller compared with the normal parts, it is desirable to set the height of the opening higher than the unusual parts but lower than the normal parts. Unusual parts are made to drop into the accumulating box by the discharging device, not to be mixed into normal parts. In this way, unusual parts are prevented from being sent to the downstream processes.

In the case of unusual parts the height of which is smaller than that of normal ones, discharge of unusual parts can be made accurately by utilizing the difference of height. The unusual parts discharging device is characterized in that it is provided with an opening of a height enabling passage of unusual parts but preventing passage of normal parts. In this way, unusual parts are sorted out and discharged in the state where a difference of height is detected accurately. Especially, since discharge of unusual parts is made on the upstream side of the point of discrimination of surface and back face, delivery of unusual parts is prevented even when the unusual parts are placed in the correct orientation. As an unusual part comes to the control board, this unusual part passes through the opening and drops into the accumulating box to be kept there, because its height is smaller than that of the opening. Therefore, even in case some unusual part is returned by error into the bowl of the part feeder, it eventually passes through the discharging device and is caught in the accumulating box, thus preventing delivery of any defective parts.

BEST MODE FOR CARRYING OUT THE INVENTION

Figure 1:
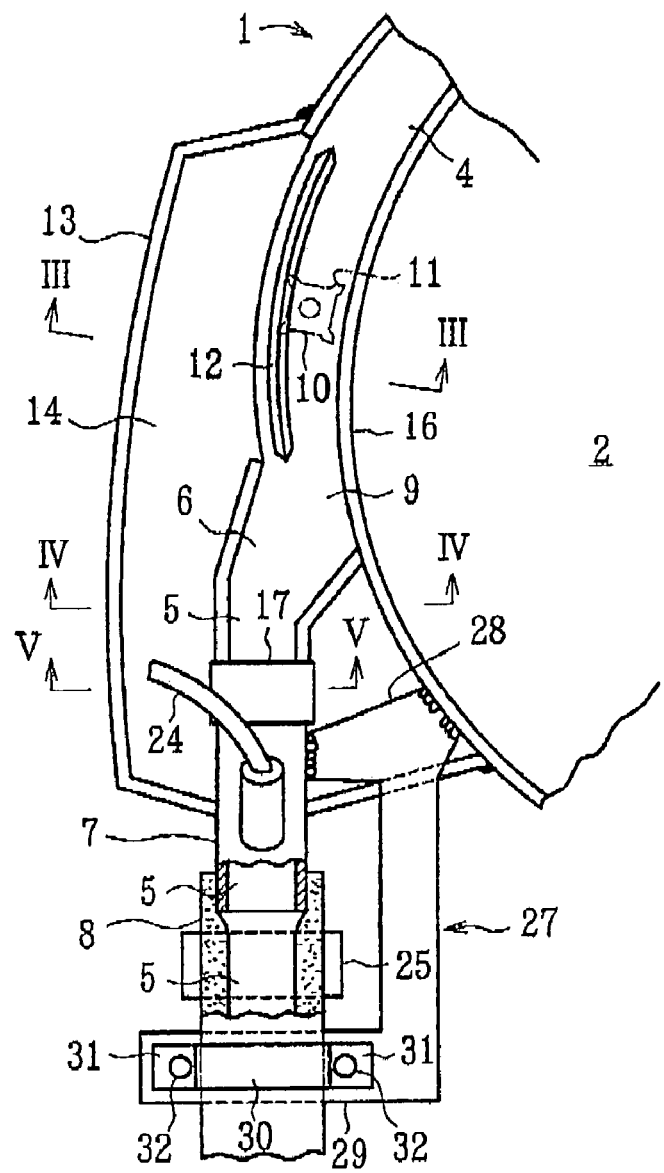
FIG. 1 is a partial plan view of the parts feeder showing an embodiment of the present invention.

The preferred embodiments of the present invention will be described in detail hereafter with reference to drawings. As form of parts feeder, there are among others a type in which a round bowl is shaken in two ways by means of a shaking device and a type in which the part is led by a magnet without shaking, with the former shaking type is given as example here. The latter type is described in Japanese patent application filed Aug. 7, 1997 and laid open under No. 11-59878, which is hereby incorporated by reference.

First of all, reference will be made to FIG. 11 and FIG. 12. A parts feeder 1 and a parts supply unit 33 are connected to each other by means of a parts transfer passage 5. The parts supply unit 33, which is used for supplying the parts or nuts, for example, sent from the parts feeder 1 to a prescribed point on a steel sheet part 42, is provided with a supply rod 37 driven forward and backward by an air cylinder 38. The steel sheet part 42 is loaded on a fixed electrode 40 of a projection welding system 39 provided with a pair of electrodes 40 and 41, and the nut is placed on a guide pin 43 of the fixed electrode 40 protruding through the steel sheet part, and then the movable electrode 41 comes down to weld the nut to the steel sheet part. The electrode 41 is constructed in a way to be driven forward and backward by an air cylinder (not illustrated).

Figure 2:
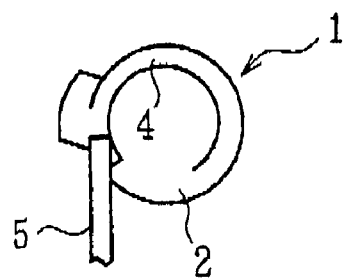
FIG. 2 is a simplified plan view showing the general shape of the parts feeder.
Figure 16:
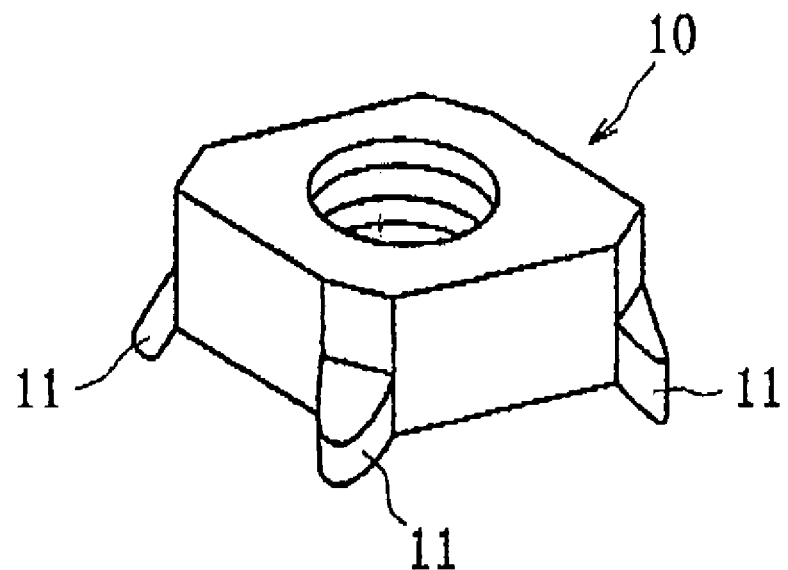
FIG. 16 is a perspective view of a projection nut.

As shown in FIG. 1 and FIG. 2, the parts feeder 1 has a round bowl 2, under which is disposed a shaking unit 3. On the inner circumference of the bowl 2 is formed a spiral passage 4, and to its outlet end is connected a transfer passage 5. The transfer passage 5, which communicates with a relay passage 6 continuous to the spiral passage 4, is formed with a delivery pipe 7 and a delivery hose 8 connected to it, etc. The spiral passage 4 is formed with a guide plate 9, and this guide plate 9 forms the relay passage 6 to the transfer passage 5. The guide plate 9 is welded to the inner wall panel 16 of the bowl 2. The part with projections handled here is a projection nut 10 of steel, having projections 11 formed at 4 corners of a square nut as shown in FIG. 16. Therefore, the shape of passage of the delivery pipe 7 and the delivery hose 8 has a rectangular section as it is apparent from FIG. 10, etc. As it is apparent from FIG. 1 and FIG. 7A, the projection 11 protrudes sideways or in the direction of breadth.

Figure 3:
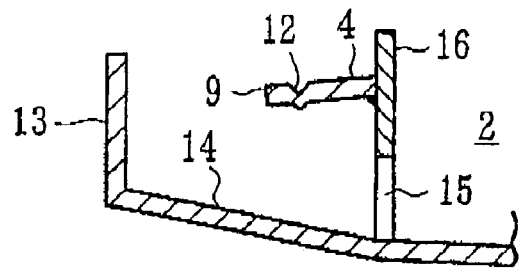
FIG. 3 is a sectional view taken along the line III—III of FIG. 1.
Figure 4:
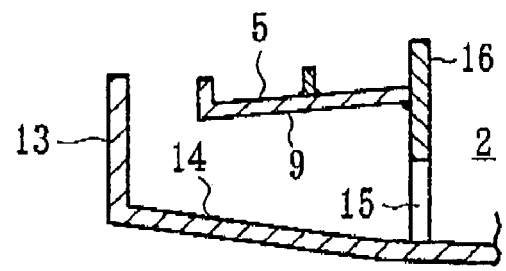
FIG. 4 is a sectional view taken along the line IV—IV of FIG. 1.

Over a certain length near the outlet end of the spiral passage 4, along the outer circumference of the guide plate 9, is formed a fastening groove 12 in the shape of an arch. As one can see from FIG. 3 and FIG. 4, the outer circumference side of the guide plate 9 gets lower from the area of the fastening groove 12 toward the relay passage 6. As shown in FIG. 4, while an upright wall is formed on the outer edge of the guide plate 9 in the relay passage 6 from around after passing through the fastening groove 12, no such upright wall exists on the outer circumference side of the fastening groove 12. Therefore, in the case where the nut 10 which arrived in the area of the fastening groove 12 is in a posture with its projections 11 down or looking "upward", the projections 11 get into the fastening groove 12 and the nut 10 moves toward the transfer passage 5 through the relay passage 6 without sliding down from the guide plate 9. In the case where the nut 10 which arrived in the area of the fastening groove 12 is in a posture with its projections 11 up or looking "downward", the nut 10 is not caught in the fastening groove 12 and, therefore, the nut 10 falls down into the receiving box 13 from the outer edge of the guide plate 9 and moves down on the sloped bottom plate 14 toward the bottom of the bowl, to be returned into the bowl 2 through the through hole 15.

Figure 5:
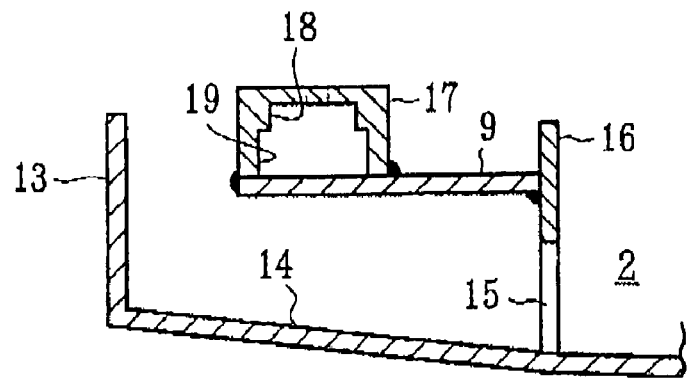
FIG. 5 is a sectional view taken along the line V—V of FIG. 1.
Figure 7A:
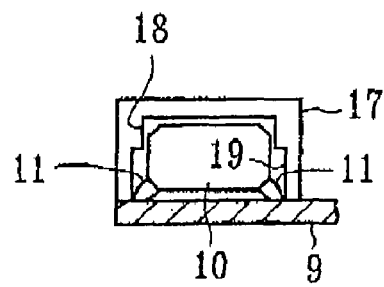
FIG. 7A is a front view of the regulating member, showing passage of a nut in normal orientation.
Figure 7B:
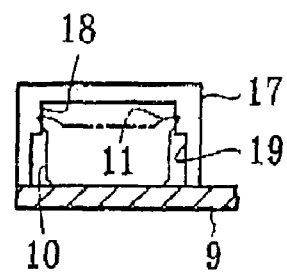
FIG. 7B is a front view of the regulating member, showing a nut in unusual orientation with imaginary line.
Figure 7C:
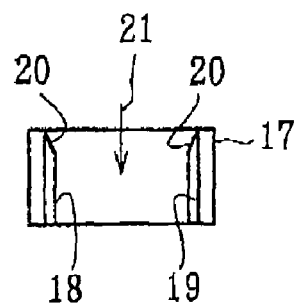
FIG. 7C is a bottom view of the regulating member indicated in FIG. 7A and FIG. 7B.

The regulating member 17, which is installed at an optional point in the longitudinal direction of the transfer passage 5, is illustrated here for a case in which it is mounted on the upstream side of the transfer passage 5. The regulating member 17, in stainless steel, is welded to the guide plate 9, and has a section in the shape of a channel opening in the downward looking direction as shown in FIG. 5. The regulating member 17 has a regulating portion 18 and a non regulating portion 19 on its inner side wall. The regulating portion 18 is set in such a way that the distance between the side wall faces i.e. the dimension of width prevents passage of the projections 11 protruding sideways from the nut. On the other hand, the non regulating portion 19 is set in such a way that the dimension of width allows passage of the projections 11. Moreover, a slope 20 is formed at the parts inlet of the regulating portion 18, as shown in FIG. 7C, to enable smooth entry of the nut 10. The arrow line 21 in this figure indicates the direction of movement of the nut 10.

Figure 8:
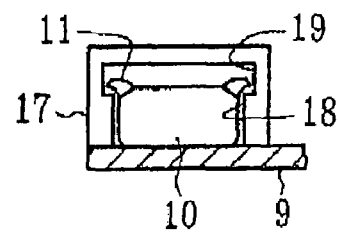
FIG. 8 is a front view of a modified example of regulating member.

The disposition of the regulating portion 18 and the non regulating portion 19 is determined depending on which of the "upward" looking posture and the "downward" looking posture is to be considered as normal. In the case where the nut 10 must be transferred in the posture with its projections down, the non regulating portion 19 will be disposed at the bottom and the regulating portion 18 will be placed on it (FIG. 5, FIG. 7A, FIG. 7B). On the contrary, in the case where the nut 10 must be transferred in the posture with its projections up, the regulating portion 18 will be disposed at the bottom and the non regulating portion 19 will be placed on it (FIG. 8).

The functions of the regulating member 17 indicated in FIG. 5 are the following: In the case where the nut 10 is transferred in the normal orientation i.e. in the posture with its projections 11 down, as shown in FIG. 7A, the projections 11 are positioned in the non regulating portion 19, and the upper side of the square part of the nut 10 is positioned in the regulating portion 18. Therefore, the nut 10 passes through without being caught in any part of the regulating member 17. In the case where the nut 10 is transferred in an unusual orientation i.e. in the posture with its projections 11 up, as shown in FIG. 7B, the square part of the nut 10 corresponds to the non regulating portion 19, and the portion having the projections 11 corresponds to the regulating portion 18. As a result, the projections 11 interfere with the regulating portion 18, preventing passage of the nut 10.

To the downstream side of the regulating member 17 is connected a delivery pipe 7, and to the delivery pipe 7 is further connected a delivery hose 8. The delivery pipe 7 is made of steel sheet while the delivery hose 8 is made of urethane and, for both of them, the transfer passage 5 has a rectangular section suitable for passage of the nut 10. The supporting arm 27 in the shape of reverse L indicated in FIG. 1 is welded, at its base 28, to the inner wall plate 16 and to the inside of the delivery pipe 7, and the delivery hose 8 is placed on the support 29 and fixed by means of a presser fixture 30 with a hat-shaped section. The presser fixture 30 is fixed to the support 29 at flanges 31 by means of fastening bolts 32.

Figure 6:
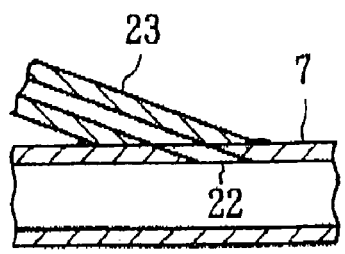
FIG. 6 is a sectional view of the portion of air injection nozzle in FIG. 1.

This system is so arranged that compressed air is blown into the delivery pipe 7, to pressure feed the nut 10 toward the delivery hose 8. FIG. 6 indicates the section of this portion, in which a nozzle hole 22 is provided in the diagonal direction against the delivery pipe 7, and an air pipe 23 is welded in a way to agree with that hole. The air pipe 23 is provided with an air hose 24 (FIG. 1). Therefore, as the nut 10 arrives on the downstream side (on the right side in the drawing) of the nozzle hole 22, compressed air is injected and the nut 10 is transferred vigorously.

Figure 10:
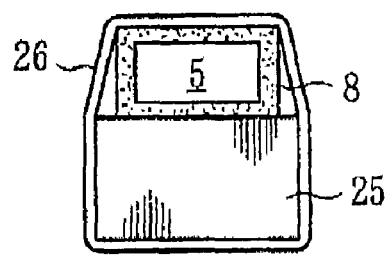
FIG. 10 is a sectional view showing the mounting of the parts sensor.

To the delivery hose 8 immediately after the delivery pipe 7 is attached a parts sensor 25. Various types of parts sensor may be adopted, but a proximity switch will be taken for example here. As shown in FIG. 10, the parts sensor 25 is put in close contact with the delivery hose 8 by means of a fixing band 26. The parts sensor 25 issues a signal when it detected the nut 10 and, in response to that signal, compressed air is injected through the nozzle hole 22 to the nut 10, to transfer the nut 10. Such actions from detection of nut to injection of air can be implemented easily by means of ordinary air selector valve or control circuit and, for that reason, no concrete explanation on this point will be given here.

Figure 11:
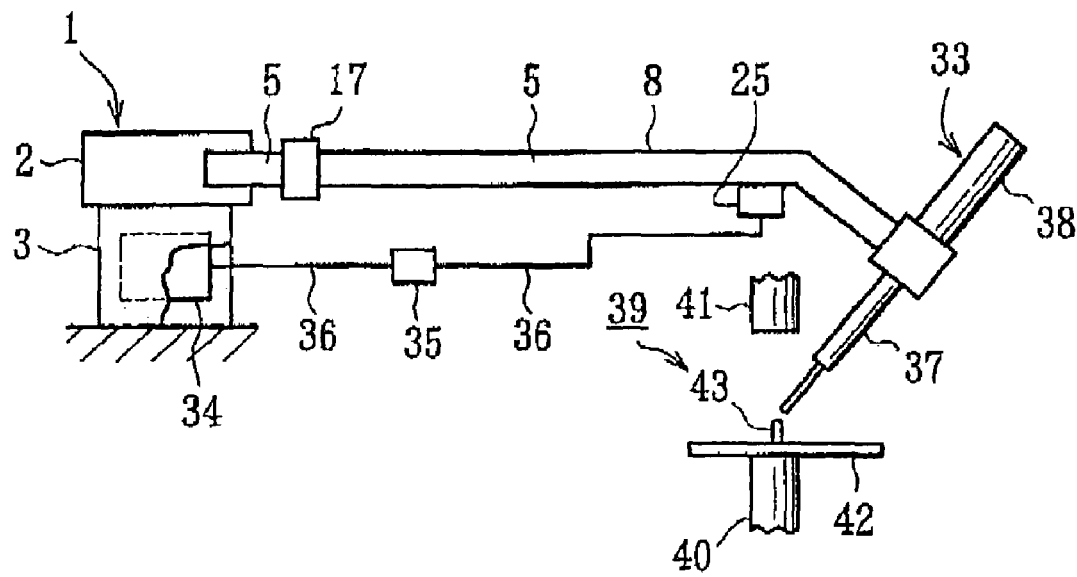
FIG. 11 is a simplified view showing a general outline of the parts supply system.

To explain the parts supply system indicated in FIG. 11, the parts feeder 1 and the parts supply unit 33 are connected to each other by means of a transfer passage 5 i.e. the delivery hose 8, and the regulating member 17 is installed at a position close to the parts feeder 1 on the transfer passage 5. The parts sensor 25 is disposed at a position close to the parts supply unit 33 on the transfer passage 5, this transfer passage 5 between the parts sensor 25 and the parts supply unit 33 discharging the function of keeping the parts on standby. The number of parts on standby may be 10 pieces for example, and no signal is issued at all from the parts sensor 25 while either the 10th or 11th piece is detected by the parts sensor 25. As the nuts 10 which stood in a line up to the parts sensor 25 are consumed by the parts supply unit 33, a decrease of the parts between the parts supply unit 33 and the parts sensor 25 is detected by the parts sensor 25, and that signal is transmitted to a shaking unit 34, to put the parts feeder 1 in operation. However, if a nut in unusual orientation is prevented from moving by the regulating member 17, it is no use continuing the operation of the parts feeder 1 and, for that reason, this system is constructed in a way to stop the parts feeder 1 with passage of a certain time after the start of operation of the parts feeder 1. For that purpose, a timer 35 is inserted on the way of the connecting wire 36 connecting between the parts sensor 25 and the shaking unit 34. In this way, when a signal is issued after passage of a certain time with the timer 35, the system works to either stop the shaking unit 34 or give an alarm in response to that signal.

Figure 12:
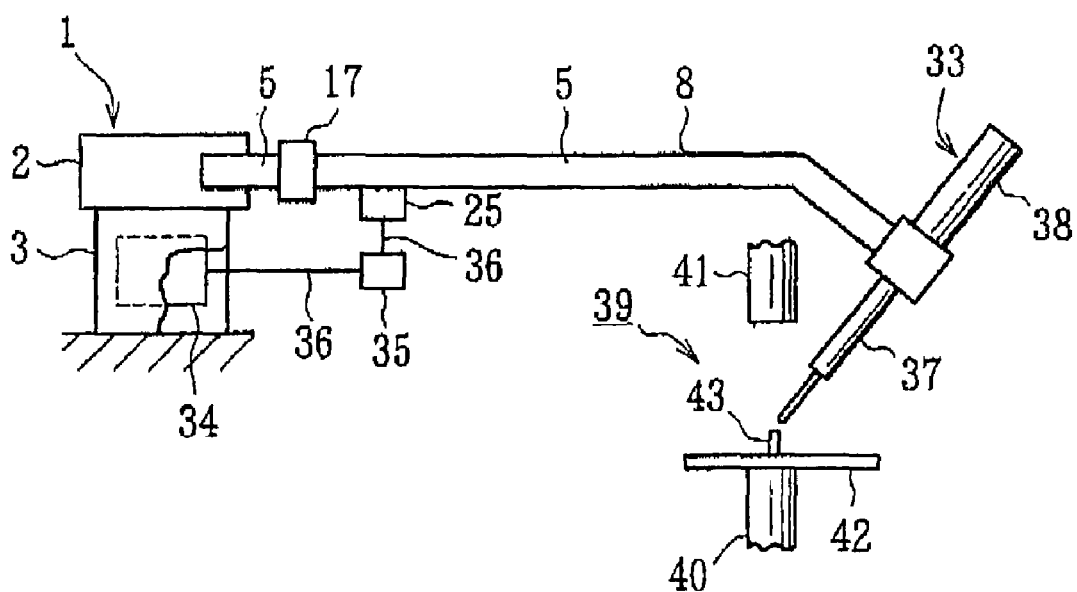
FIG. 12 is a simplified view showing a general outline of the parts supply system with a modified parts sensor position.

The parts supply system indicated in FIG. 12 is different from that of FIG. 11 only in the place of installation of the parts sensor 25. Here, the parts sensor 25 is provided near the parts feeder 1 and in the transfer passage 5 downstream of the regulating member 17. With such construction, when the nuts 10 are sent out at regular intervals without being prevented by the regulating member 17, the parts sensor 25 detects it and sends a signal to the timer 35, which starts counting in response to that signal. No abnormality signal is transmitted from the timer 35, because the nuts further come flowing one after another and a signal is sent from the parts sensor 25 to the timer 35. However, in case a nut in unusual orientation is caught by the regulating member 17, the transfer of nuts is suspended for a certain period of time, and the timer 35 which started counting in response to a signal from the parts sensor 25 issues an abnormality signal, thereby stopping the operation of the parts feeder 1 or giving an alarm.

Figure 9:
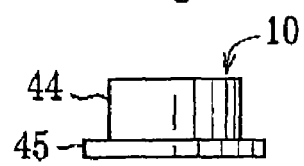
FIG. 9 is a side view of another part.

The object part for which the present invention is intended has projections formed on either the upper side or the lower side as seen in the direction of height and protruding in both the width in the longitudinal direction and the width in the transversal direction (refer to the shape indicated with two-dot chain line in FIG. 1), and projection nut is a typical example of such part. On the other hand, even a part 10 in which a round flange 45 is installed under a round body 44 as shown in FIG. 9 can also be an object of the present invention, the round flange 45 corresponding to the projection.

Figure 15:
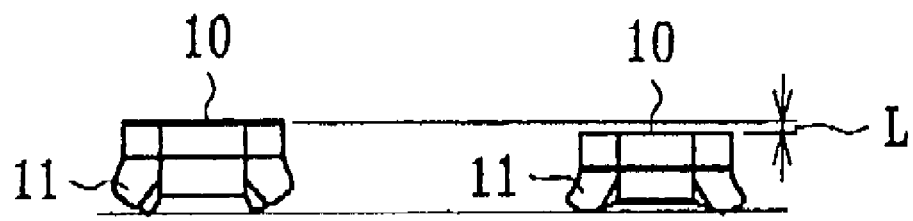
FIG. 15 is a side view of a projection nut, the left side showing a normal nut and the right side showing an unusual nut.

In the above-described embodiment, while the surface and the back face of the nuts 10 are discriminated uniformly based on their dimension of width, there is a fear that, if any unusual nut is mixed there, it may be delivered without being caught. FIG. 15 indicates comparison of a normal projection nut 10 with an unusual one. In the field of welding, there are cases where the projection 11 for welding remains fallen on the floor without being molten sufficiently because of a shortage of welding current or pressurization. However, it sometimes happens that a worker who picked it up thinks that the nut is a normal one and throws it into the parts feeder. That unusual nut will be fed together with other normal nuts, but it is supplied normally to the welding machine without being prevented by the regulating member 17, if it is in the prescribed orientation. Since that unusual nut is unusual in the height or shape of the projection 11, it cannot be welded normally, and thus produces a defect such as incomplete welding, etc.

Namely, for the discrimination of surface and back face of the nut 10, the so-called "face up" system is generally adopted in which the nut is delivered as it is without falling if only the projection 11 is caught in the groove 12 of the spiral passage 4. In the case where an unusual nut 10 as shown on the right side of FIG. 15 comes to the groove 12 under such condition, that projection 11 is also caught in the groove 12 in the same way as a normal projection 11, and is thus sent out in the form of "face up" as normal product. As described above, a problem is that ordinary discrimination of surface and back face is not enough in case some projection 11 of unusual shape is mixed even if it is a projection nut of one same type.

Figure 13:
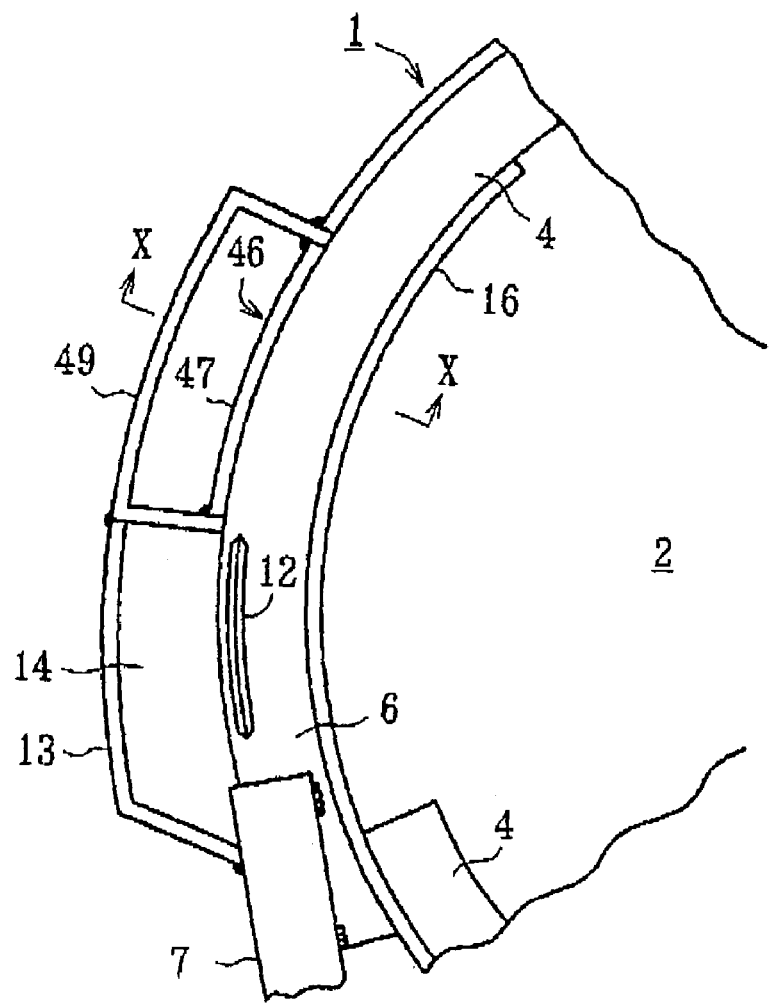
FIG. 13 is a partial plan view similar to FIG. 1 showing another embodiment of the present invention.
Figure 14:
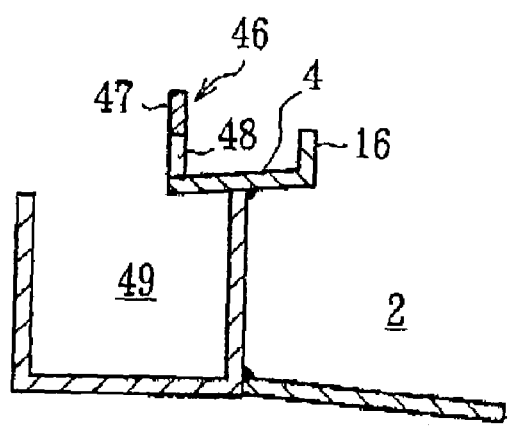
FIG. 14 is a sectional view X—X in FIG. 13.

An embodiment designed for solving such problem will now be described according to FIG. 13 and FIG. 14. As previously described in relation to FIG. 1 and FIG. 3, a spiral passage 4 of stepped structure is provided around a bowl 2, and this spiral passage 4 is lower on the outer circumferential side. At the end part i.e. outlet end of the spiral passage 4 is formed an arched groove 12 close to its outer circumference, and this is the means for discriminating the surface and the back face. To the end part of the spiral passage 4 is connected a delivery pipe 7.

On the upstream side of the groove 12 is installed a sorting means 46 for discharging unusual nuts. This is a control plate 47 welded in upright state on the outer circumference of the spiral passage 4, and a regulating space 48 is formed at its lower part. This space 48, in the shape of a slit extending along the spiral passage 4, is set at a height allowing the unusual nut indicated on the right side of FIG. 15 to pass but not allowing passage of the normal nut indicated on the left side of FIG. 15. Namely, because a normal nut and an unusual nut are different in the height indicated with symbol L, the judgement of passage or not is made with this difference L.

On the outside of the control plate 47 is installed an accumulating box 49. This has a structure without any outlet, and unusual nuts falling through the regulating space 48 into this box 49 are accumulated there.

Next, the action of this embodiment will be described. As a normal nut 10 on the left side of FIG. 15 moves along the spiral passage 4, the nut 10 comes to the control plate 47 but cannot pass through the regulating space 48 because the height of the nut 10 is larger than that of the regulating space 48, and it moves toward the groove 12. If an unusual nut 10 on the right side of FIG. 15 comes to the control plate 47, this nut passes through the space 48 and falls down into the accumulating box 49 to be stored there, because the height of the nut 10 is smaller than that of the regulating space 48. Therefore, delivery of any defective nut can be prevented, because an unusual nut which is returned by error into the bowl 2 gets in the state enclosed in the accumulating box 49.

This invention is intended to discharge nuts of unusually low height from among nuts of identical dimensions and shape, in the case where only projection nuts of one single kind are placed in the parts feeder, namely unusual nuts the height of which is reduced because of deformation of the projections for welding. In other words, the present invention functions in the case where a difference of height is produced in one kind of nuts in one same bowl.

The invention claimed is:

1. An apparatus for transferring parts with projections, wherein said parts have a first side and an opposite second side, and the projections are formed on either the first side or the second side, the apparatus comprising:
 a regulating member having a passage shaped to allow passage of the parts only when the parts are positioned in a predetermined orientation; and
 a sorting device disposed on upstream side of the regulating member, wherein the sorting device includes a spiral guide plate formed over a round bowl of a parts feeder, the spiral guide plate has an outer circumference and an inner circumference along the direction of transfer of the parts, a groove is formed on an upper surface of the spiral guide plate and extends in the direction of transfer of the parts, a portion of the spiral guide plate that contains the groove is tilted from said inner circumference toward said outer circumference, and the groove is designed to engage with the projections of the parts so as to prevent the parts from falling off the tilted portion of the spiral guide plate.

2. An apparatus as defined in claim 1, wherein the passage of the regulating member has a regulating portion of a width for preventing passage of a protruding portion defined by the projections of the parts, and a non regulating portion of a width allowing passage of the protruding portion of the parts.

3. An apparatus as defined in claim 1, further comprising a discharging device disposed on upstream side of the regulating member, said discharging device being composed of a portion of a spiral passage which is tilted toward said outer circumference, an upright wall provided on the outer circumference of said portion, an opening formed in a bottom portion of said upright wall for discharging abnormal parts while normal parts cannot pass through the opening, and an accumulating box, positioned below said opening, for receiving said abnormal parts dropping from said opening.

4. An apparatus as defined in claim 1, wherein the parts are a nut.

5. An apparatus as defined in claim 1, wherein a space between the groove and the inner circumference of the spiral guide plate is large enough to allow the parts to pass through the space.

* * * * *